United States Patent
Chan et al.

(10) Patent No.: US 9,122,491 B2
(45) Date of Patent: Sep. 1, 2015

(54) DETECTING SERIALIZATION SCHEME USED IN SOFTWARE APPLICATIONS

(71) Applicant: NEXTBIT SYSTEMS INC., San Francisco, CA (US)

(72) Inventors: Michael A. Chan, San Francisco, CA (US); Justin Quan, San Francisco, CA (US); Michael K. Fleming, San Francisco, CA (US); Daniel R. Bornstein, San Francisco, CA (US)

(73) Assignee: NEXTBIT SYSTEMS INC

( * ) Notice: Subject to any disclaimer, the term of this patent is extended or adjusted under 35 U.S.C. 154(b) by 0 days.

(21) Appl. No.: 14/199,909

(22) Filed: Mar. 6, 2014

(65) Prior Publication Data

US 2014/0289717 A1 Sep. 25, 2014

Related U.S. Application Data

(60) Provisional application No. 61/804,134, filed on Mar. 21, 2013.

(51) Int. Cl.
*G06F 9/45* (2006.01)
*G06F 9/54* (2006.01)
(Continued)

(52) U.S. Cl.
CPC .. *G06F 8/44* (2013.01); *G06F 9/54* (2013.01); *G06F 11/1464* (2013.01); *G06F 17/3053* (2013.01); *G06F 17/30174* (2013.01); *G06F 17/30194* (2013.01); *G06F 17/30575* (2013.01); *H04L 41/0816* (2013.01); *H04L 47/70* (2013.01); *H04L 47/78* (2013.01); *H04L 63/0853* (2013.01); *H04L 67/10* (2013.01);
(Continued)

(58) Field of Classification Search
CPC ........... G06F 8/447; G06F 9/54; G06F 9/465; G06F 17/30174; H04W 12/06
USPC ........................................................ 717/147
See application file for complete search history.

(56) References Cited

U.S. PATENT DOCUMENTS 6,412,107 B1 6/2002 Cyran et al.
6,718,539 B1 * 4/2004 Cohen et al. .................. 717/136
(Continued)

OTHER PUBLICATIONS

Anonymous, "Method and apparatus for optimized serialization and deserialization of objects in virtualized environments", IPCOM000219074D, Jun. 2012, 14pg.*

(Continued)

*Primary Examiner* — Ryan Coyer (57) ABSTRACT

Technology is disclosed for determining a serialization scheme used in serializing a software object by an application ("the technology"). A source application can serialize the object using multiple serialization schemes. In order for another application to deserialize the object serialized by the source application, the application may have to know the serialization scheme used in serializing the object. The technology can analyze an intermediate code, e.g., bytecode, of the source application to determine the serialization scheme used by the source application. The technology compares a portion of the code of the source application that serializes the objects with multiple serialization scheme templates having code for known serialization schemes and determines the serialization scheme used by the source application based on a matching serialization scheme template. After the serialization scheme is identified, the application can reconstruct the object from the serialized object using the identified serialization scheme.

22 Claims, 7 Drawing Sheets

(51) Int. Cl.
  *G06F 17/30* (2006.01)
  *H04L 29/08* (2006.01)
  *G06F 11/14* (2006.01)
  *H04L 12/24* (2006.01)
  *H04L 12/911* (2013.01)
  *H04L 29/06* (2006.01)
  *H04W 12/06* (2009.01)

(52) U.S. Cl.
  CPC ............ *H04L 67/1095* (2013.01); *H04L 69/04* (2013.01); *H04W 12/06* (2013.01)

(56) References Cited

U.S. PATENT DOCUMENTS

| | | | | |
|---|---|---|---|---|
| 6,848,108 | B1* | 1/2005 | Caron | 719/315 |
| 8,375,399 | B2* | 2/2013 | Peterson et al. | 719/313 |
| 2004/0088687 | A1 | 5/2004 | Dalton et al. | |
| 2004/0230958 | A1* | 11/2004 | Alaluf | 717/140 |
| 2004/0255268 | A1* | 12/2004 | Meijer et al. | 717/106 |
| 2004/0261008 | A1 | 12/2004 | Pepin et al. | |
| 2005/0097110 | A1* | 5/2005 | Nishanov et al. | 707/100 |
| 2008/0016573 | A1 | 1/2008 | Lyashko | |

OTHER PUBLICATIONS

IBM et al., "System and Method for Java Serialization Compatibility using XML", IPCOM000015489D, 2002, 4pg.*

Oppold et al., "Design and Validation of Execution Schemes for Dynamically Reconfigurable Architectures", IEEE, 2006, 4pg.*

Truyen et al., "Portable Support for Transparent Thread Migration in Java", Springer, 2000, 14pg.*

International Search Report for International Application No. PCT/US2014/031375 mailed on Aug. 7, 2014.

* cited by examiner

DETECTING SERIALIZATION SCHEME USED IN SOFTWARE APPLICATIONS

CROSS-REFERENCE TO RELATED APPLICATION(S)

This application claims the benefit of U.S. Provisional Patent Application No. 61/804,134, entitled "OPERATING SYSTEM AND DEVICE INTEGRATED WITH CLOUD COMPUTING FUNCTIONALITIES", filed on Mar. 21, 2013, which is incorporated by reference herein in its entirety.

TECHNICAL FIELD

Several of the disclosed embodiments relate to serialization, and more particularly, to detecting serialization schemes used in software applications.

BACKGROUND

Serialization is a process of translating data structures or object state into a format that can be stored, for example, in a file or memory buffer, or transmitted across a network connection link and reconstructed later in the same or another computer environment. A software object ("object") has state and behavior. The objects correspond to things found in the real world. So for example, a graphics program will have objects such as a circle, a square, and a menu. An online shopping system will have objects such as a shopping cart, a customer, and a product. When an object is serialized, the state of the object, that is, the attributes and attribute values of the object, is written to a data stream as a serialized object in a particular format. The serialized object can be stored in the persistent storage device or transmitted to another computing device. Some example formats of a serialized object include binary format, human-readable formats such as XML, JavaScript Object Notation (JSON) etc. Some other properties of the object such as a name of the class to which the object belongs, a name of the class of non-primitive attributes are also written to the data stream. When the object is serialized into the binary format, the class names, the attributes, the attribute values are written into the serialized object as a stream of bytes in a particular sequence.

The content of the byte stream, the sequence in which the data is written into the byte stream depends on a serialization scheme used by the application that generated the serialized object. Different serialization schemes have different properties and purposes. For example, some serialization schemes are intended to be faster in serializing data, some are intended to be faster in deserializing, some are intended to produce smaller size serialized objects, etc. Some serialization schemes include a complete class name for every non-primitive attribute of the object even though the class name has already appeared once for a previous attribute in the serialized object, some use a short code to identify the repeating class names, etc.

An application can reconstruct the object by deserializing the serialized object. Deserializing the serialized object includes reading the byte stream from the serialized object and constructing the data of the object corresponding to the attributes and the attribute values represented by the sequence of bytes in the byte stream. The application can deserialize the serialized object if the application knows the serialization scheme used in the serialization, which may not a problem for an application that generated the serialized object. However, if another application intends to reconstruct the object, it may not be possible to reconstruct the object since the other application does not know the serialization scheme used for generating the serialized object.

DETAILED DESCRIPTION

Technology is disclosed for determining a serialization scheme used for serializing a software object by an application ("the technology"). When a software object (hereinafter referred to as "object") is serialized, the state of the object, e.g., the attributes of the object and attribute values, is written to a data stream as a serialized object. The serialized object can be stored at a storage device, or transmitted over a network for use by another device. An application can serialize the objects based on multiple serialization schemes. Different serialization schemes have different properties and purposes. For example, some serialization schemes are intended to be faster in serializing data, some are intended to be faster in deserializing, some are intended to produce smaller size serialized objects, etc. Some serialization schemes include a complete class name for every non-primitive attribute of the object even though the class name has already appeared once for a previous attribute in the serialized object, some use a short code to identify the repeating class names, etc.

In order for the applications to deserialize the serialized object, the applications may have to know the serialization scheme used in serializing the objects. In some embodiments, the technology identifies the serialization scheme used in serializing the objects by comparing a portion of the code of the application that serializes the objects with multiple serialization scheme templates having code of known serialization schemes. The serialization scheme corresponding to the matching serialization scheme template is the serialization scheme used in serializing the objects.

In some embodiments, the technology uses an intermediate code of the application for identifying the serialization scheme used by the application. The intermediate code of the application can be generated by translating, e.g., compiling, the source code of the application. The intermediate code is then either interpreted or further translated to machine code for executing the application. In some embodiments, the application is written using Java programming language and the intermediate code is a bytecode, which is generated by compiling the source code of the application. The bytecode may often be either directly executed on a virtual machine (e.g., java virtual machine). The technology inspects the intermediate code to identify the portion of the code that contains the code for serialization, compares the portion of the intermediate code with the code of serialization scheme templates, which can also be in intermediate format, to identify a matching serialization scheme template, and identifies the corresponding serialization scheme. After the serialization scheme is identified, the objects may be regenerated by deserializing the serialized objects based on the identified serialization scheme.

In some embodiments, the application can be a graphical user interface (GUI) based application and the objects can be user interface (UI) elements. An example of a UI based application can include a Java application, and an example of UI element can include a textbox, a radio element, a drop down box, or a list. When the UI elements are serialized, the attribute values of the UI elements are stored. The application can serialize the UI elements using various serialization schemes. For example, the application can use a serialization scheme provided by the default serialization application programming interface (API) of Java. In another example, the application can customize the default serialization API provided by Java to serialize the UI elements in a user-defined way, e.g., to reduce the size of the serialized objects.

An application may want to deserialize objects serialized by other applications for various purposes, e.g., for integrating the other applications with the application by using their objects, or for analyzing the objects to generate various information regarding the object, the properties or attributes of the object.

Environment

Figure 1:
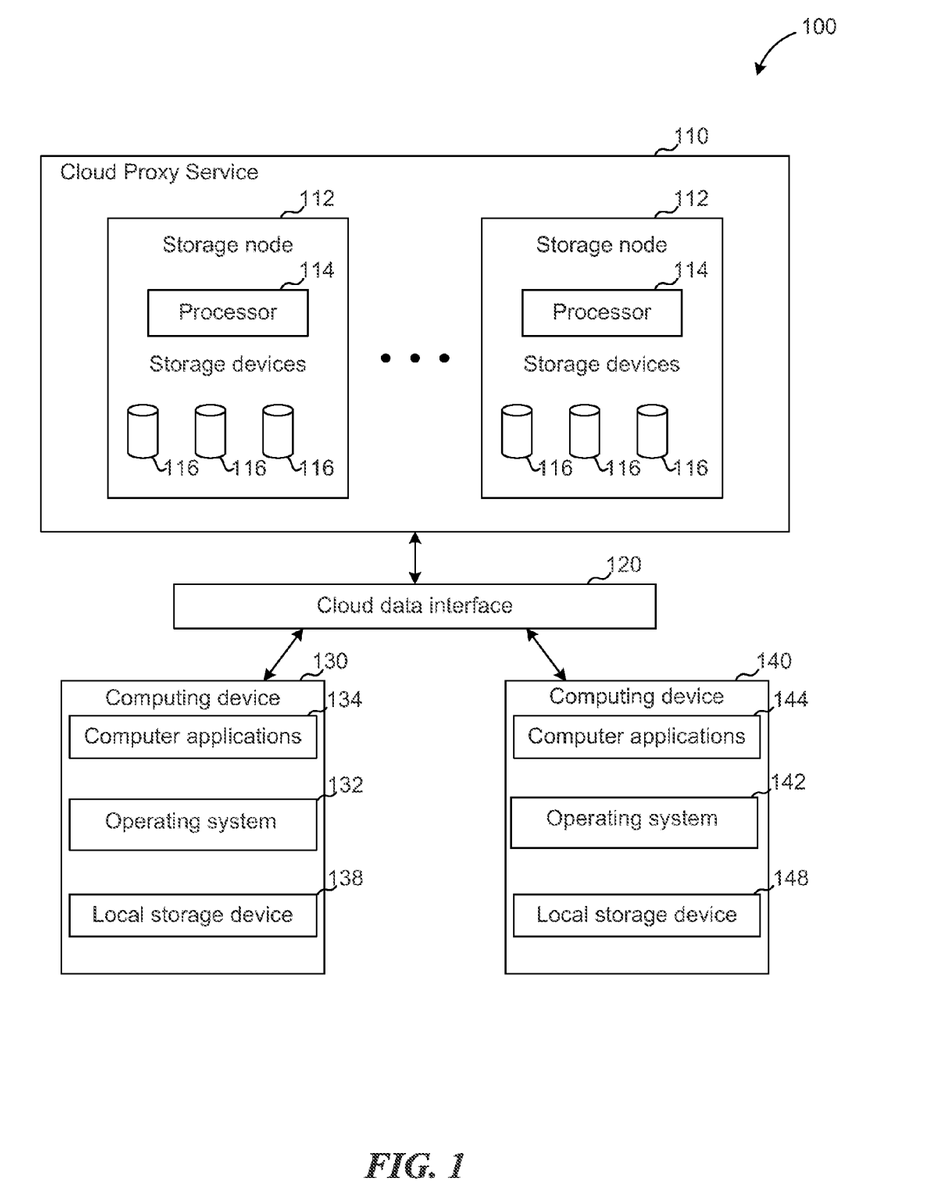
FIG. 1 is a block diagram illustrating an environment in which embodiments of the disclosed technology can be implemented.

FIG. 1 is a block diagram illustrating an environment 100 in which determination of the serialization scheme can be implemented. The environment 100 includes a cloud proxy service 110 configured to handle communications between the computing devices 130-140. The cloud proxy service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud data interface 120 can also be included to receive data from and send data to computing devices 130-140. The cloud data interface 120 can include network communication hardware and network connection logic to receive the information from computing devices. The network can be a local area network (LAN), wide area network (WAN) or the Internet. The cloud data interface 120 may include a queuing mechanism to organize data update received from or sent to the computing devices 130 and 140.

In some embodiments, any communication between the computing devices 130-140 is routed through the cloud proxy service 110. For example, data related to computer applications 134 and 144, including serialized objects, can be exchanged between the computing devices 130-140 through cloud proxy service 110. In another example, in an environment where the computing devices 130-140 can communicate with each other directly using a peer to peer communication technique, e.g. Bluetooth, the cloud proxy service 110 facilitates the computing devices 130-140 to communicate directly for exchanging the data. In some embodiments, while the computing devices 130 and 140 send/receive the data directly, the cloud proxy service 110 may also obtain a copy of the data.

Although FIG. 1 illustrates two computing devices 130 and 140, a person having ordinary skill in the art will readily understand that the technology disclosed herein can be applied to a single computing device or more than two computing devices connected to the cloud proxy service 110.

The computing devices 130-140 include an operating system 132-142 to manage the hardware resources of the computing devices 130-140 and provide services for running computer applications 134-144 (e.g., mobile applications running on mobile devices). The operating system 132-142 facilitates execution of the computer applications 134-144 on the computing device 130-140. The computing devices 130-140 include at least one local storage device 138-148 to store the computer applications 134-144 and user data. The computing device 130 or 140 can be a desktop computer, a laptop computer, a tablet computer, an automobile computer, a game console, a smartphone, a personal digital assistant, or other computing devices capable of running computer applications, as contemplated by a person having ordinary skill in the art. Some examples of the operating system 132-142 include Android, iOS, Windows, etc.

The computer applications 134-144 stored in the computing devices 130-140 can include applications for general productivity and information retrieval, including email, calendar, contacts, stock market and weather information. The computer applications 134-144 can also include applications in other categories, such as mobile games, factory automation, GPS and location-based services, banking, order-tracking, ticket purchases or any other categories as contemplated by a person having ordinary skill in the art.

All or some of the network connections of the computing devices 130-140 are through the cloud proxy service 110. The network connections can include Transmission Control Protocol (TCP) connections, User Datagram Protocol (UDP) connections, or other types of network connections based on other protocols. When there are multiple computer applications 134-144 that need network connections to multiple remote servers, the computing devices 130-140 only needs to maintain one network connections with the cloud proxy service 110. The cloud proxy service 110 will in turn maintain multiple connections with the remote servers on behalf of the computer applications 134-144.

In some embodiments, the computer applications 134-144 generate various objects in the memory of the computing devices 130-140 during the execution of the computer applications 134-144. Some of the objects can be serialized by the application that created them and (a) stored in the local storage devices 138-148 for later use by the same application or other applications and/or (b) transmitted to other computing devices for use by other computer applications. The applications can serialize the objects using various serialization schemes.

The applications which want to use the data from the serialized objects, reconstruct the objects by deserializing the serialized objects. The serialized objects are deserialized based on the serialization scheme used for serializing the objects. If the applications do not know the serialization scheme used for serializing the objects, the computing devices 130-140 determine the serialization scheme used for serializing the objects, for example, by inspecting the code of the application that serialized the objects. Additional details with respect to determination of serialization schemes are described at least with reference to FIGS. 2-6.

Figure 2:
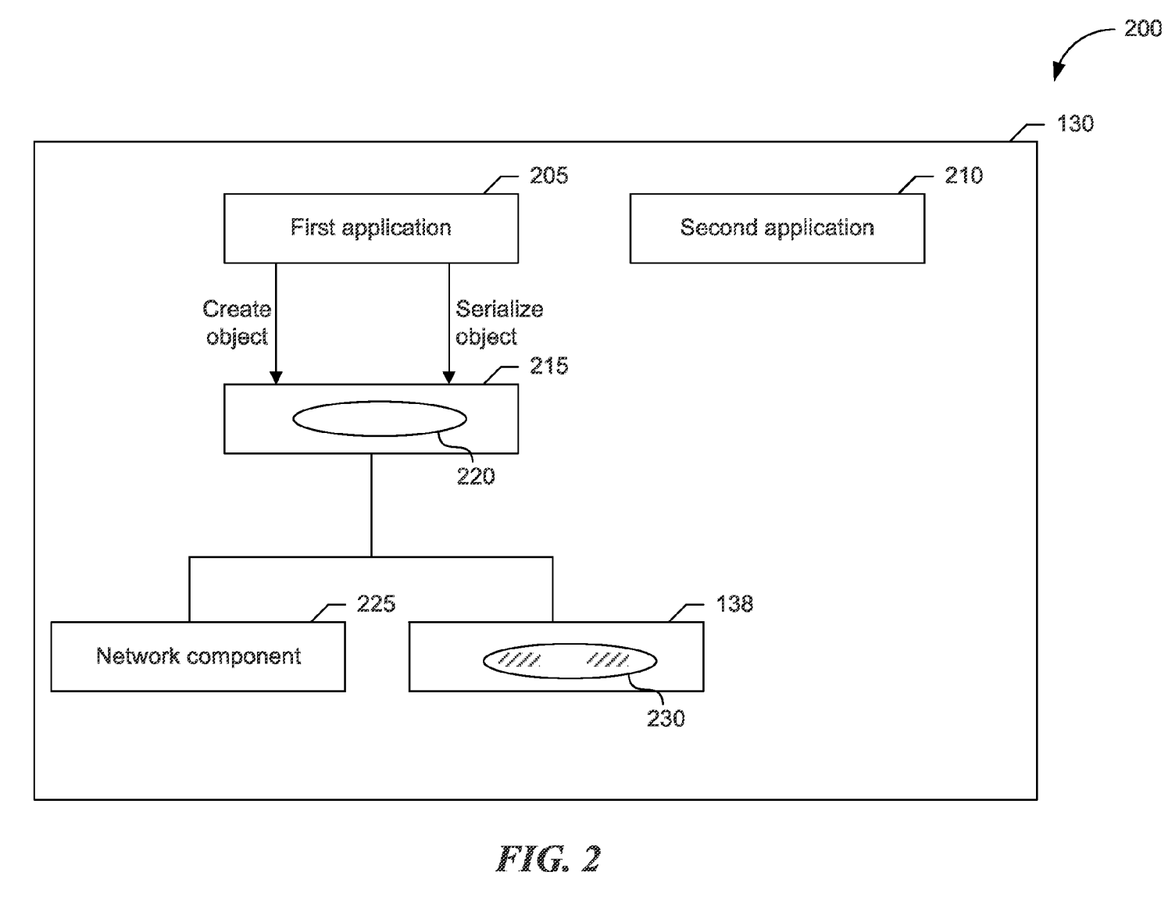
FIG. 2 is a block diagram illustrating serializing objects by an application in a computing device, consistent with various embodiments of the disclosed technology.

FIG. 2 is a block diagram 200 illustrating serializing objects, consistent with various embodiments of the disclosed technology. One of the computer applications 134, e.g., a first application 205, executing on the computing device 130 generates various objects, e.g., object 220, in a memory 215 of the computing device 130. When the first application 205 serializes the object 220, the state of the object 220 is written to a data stream as a serialized object 230. The serialized object 230 can be stored in a data container, e.g., a file, at the local storage device 138 and/or transmitted to another computing device, e.g., computing device 140, via network component 225 for use by an application executing on the computing device 140. In some embodiments, the object 220 may be serialized based on multiple serialization schemes as illustrated in FIG. 3.

Figure 3:
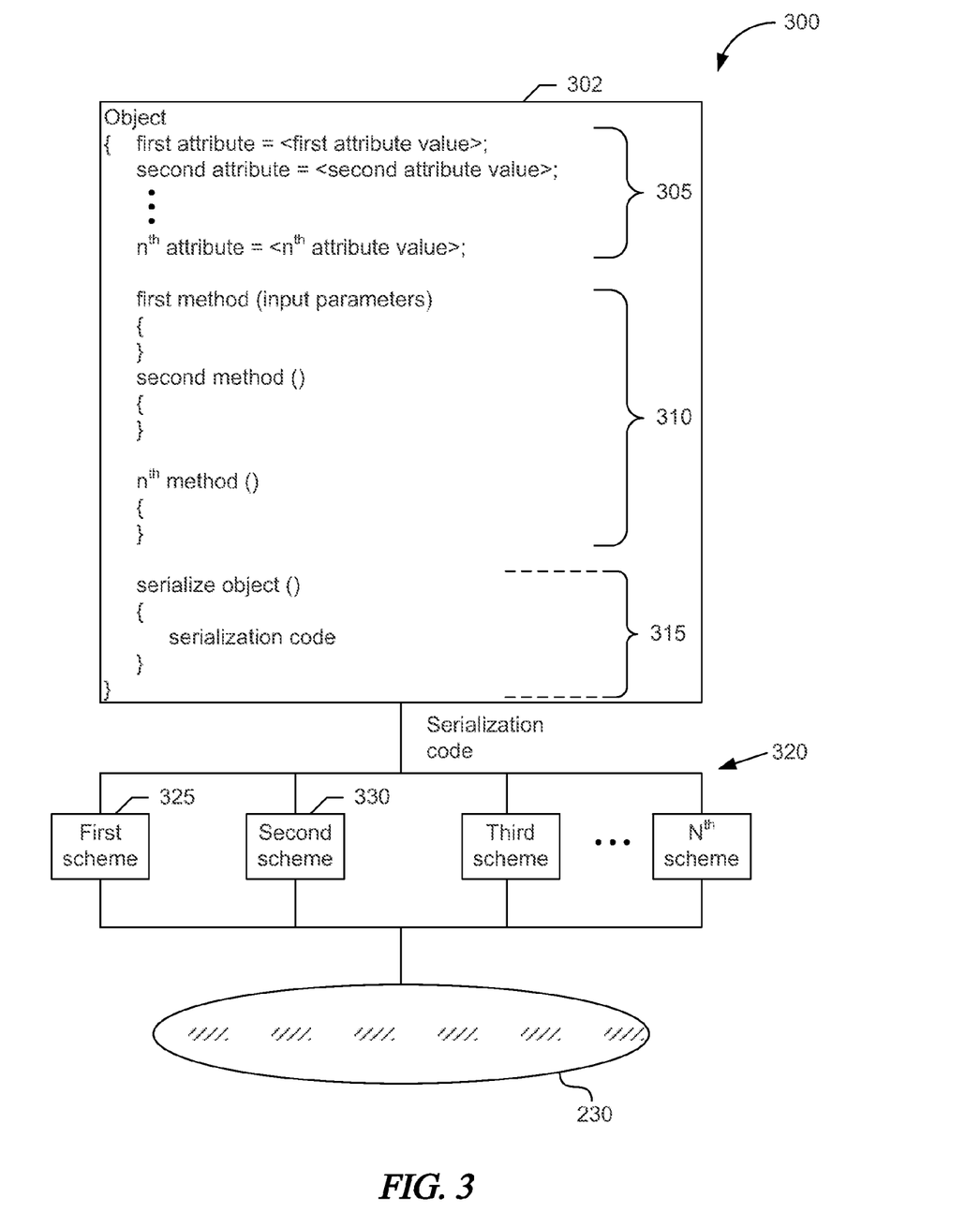
FIG. 3 illustrates an example source code of an application containing object code and serialization code for serializing the object based on various serialization schemes, consistent with various embodiments of the disclosed technology.

FIG. 3 illustrates an example source code of an application containing object code and serialization code for serializing the object based on various serialization schemes. The block diagram 300 illustrates a portion of source code 302 of the first application 205 including the code for the object 220. (Note that the source code 302 is an example representation of a source code written in a high level programming language. The syntax of the source code 302 depends on the actual high level programming language used to write the source code.) The attributes and attribute values form the state 305 of the object 220, and the methods or functions form the behavior 310 of the object 220. When the first application 205 serializes the object 220, the state 305 is written into the serialized object 230. For example, the first application 205 can be a car racing game application and the object 220 can be an UI element, such as a car, of the game. The state 305 of the car can include attributes and attribute values such as "make=Ferrari," "model=f40," "color=red," "current speed=120 mph," "current gear=5," and "steering response=moderate." The behavior 310 can include methods for changing the gear, controlling the steering, increasing or decreasing the speed etc. When a user playing the game saves the game, the game application saves the state of the game by serializing the UI elements of the game, including the car UI element. When the car UI element is serialized, the state 305 of the car UI element is written to the serialized object 230.

The source code 302 includes a serialization method 315 (also referred to as "serialization code 315") that can be used to serialize the object 220. The serialization method 315 can use the serialization API provided by the programming language in which the source code 302 is written. The first application 205 may use the serialization API as is (e.g., without any customization to the serialization API) to serialize the object 220. The object 220 will be serialized based on the serialization scheme provided by the programming language of the source code 302. Alternatively, the first application 205 may customize the serialization method 315 to serialize the object 220 based one or more serialization schemes 320.

In some embodiments, a first serialization scheme 325 is intended for generating a serialized object of a relatively smaller size. Consider that the source code 302 is written in Java. For example, without customization to serialization API provided by Java, the two classes: game.experiment.DvDraw.Objects.Car and game.experiment.DVDraw.global.Road would be serialized with their fully specified names written to the stream. Both classes have common part of their package names—"game.experiment.DvDraw" and the size of serialized object may be minimized by not repeating the common part, e.g., for every serialized object that belongs to a package in this hierarchy. When both classes are serialized one after another, the full name of the first one is written to the stream, but not for the second one. A short code, e.g., a 2-byte code, can be assigned for the common part "game.experiment.DvDraw," when the first class is serialized and can then be written to the stream, followed by the class specific part of the name, "global.Road". The second class can be encoded in the following way: "00 FE global.Road", where "00 FE" is the 2-byte code for "game.experiment.DVDraw." Accordingly, the serialization method 315 in the first serialization scheme 325 is customized to include the code for performing for such a serialization.

In some embodiments, a second serialization scheme 330 is intended for generating a serialized object intended to be deserialized relatively fast. Accordingly, the serialization method 315 in the second serialization scheme 330 is customized to include the code for performing for such a serialization. Also, in some embodiments, different serialization schemes 320 can employ different encryption techniques to encrypt the data being serialized.

Accordingly, when the object 220 is serialized, the class names, the attributes, the attribute values are written into the serialized object as a stream of bytes in a particular sequence. The content of the byte stream, the sequence in which the data is written into the byte stream depends on a serialization scheme used by the application that generated the serialized object.

The data from the serialized object 230, e.g., state of the object 220, can be extracted by deserializing the serialized object 230. However, to deserialize the serialized object 230, an application has to know the serialization scheme used in serializing the object 220. The first application 205, which serialized the object 220, can deserialize the serialized object 230 since the first application 205 contains the serialization scheme used in serializing the objects. However, if another application, e.g., the second application 210, wants to deserialize the serialized object 230, the second application 210 may not be able to deserialize the serialized object 230 unless the second application 210 determines the serialization scheme used in serializing the object 220.

Figure 4:
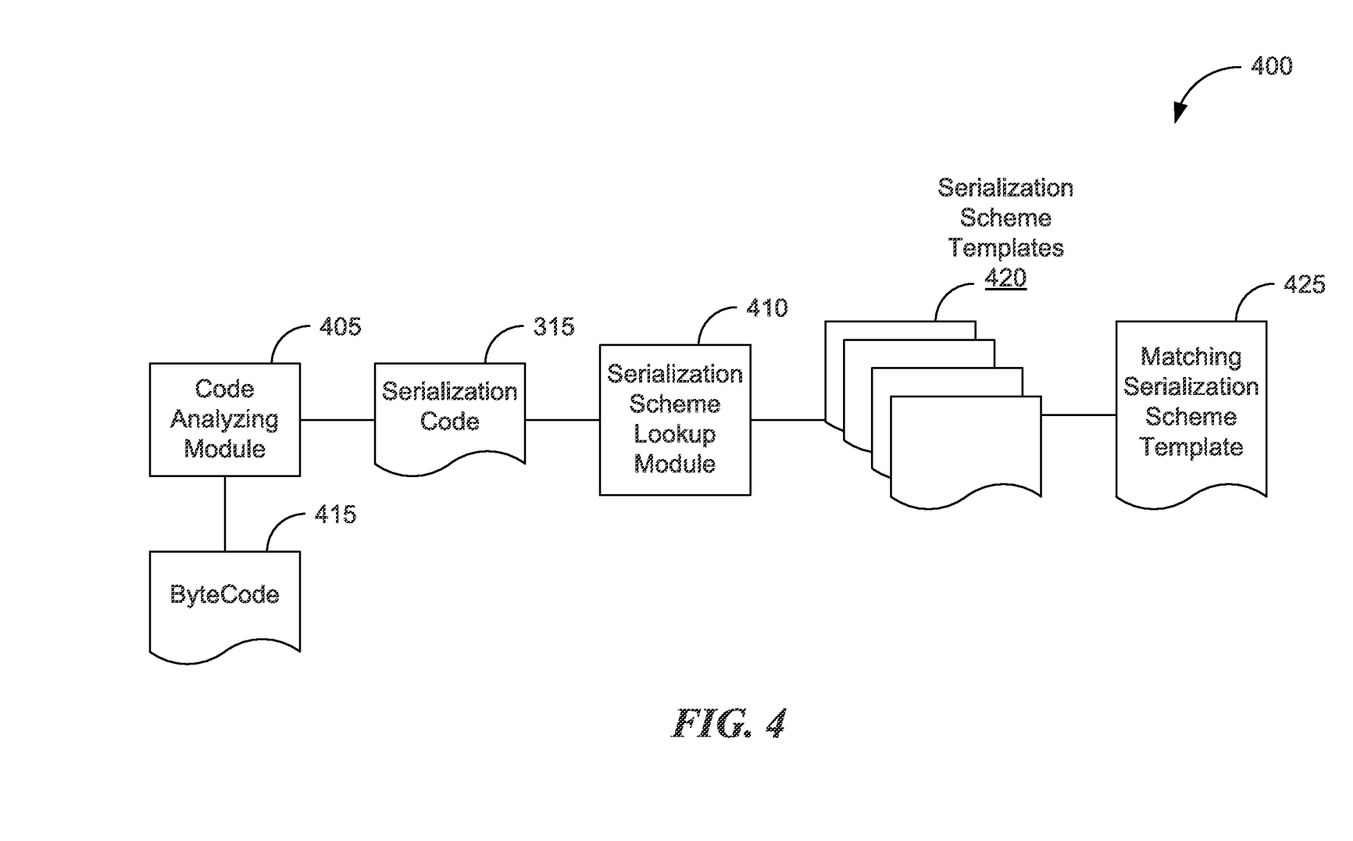
FIG. 4 is a block diagram for determining a serialization scheme used in serializing the object, consistent with various embodiments of the disclosed technology.

FIG. 4 is a block diagram of a system 400 for determining a serialization scheme used in serializing an object, consistent with various embodiments of the disclosed technology. In some embodiments, the system 400 can be implemented using the computing device 130 or 140 of FIG. 1 for determining the serialization scheme used by the first application 205 of FIG. 2 in serializing the object 220. Consider that the first application 205 and the second application 210 are provided by different entities and the second application 210 intends to use the serialized object 230 generated by the first application 205. Since the second application 210 does not know the serialization scheme used in serializing the object 220, the second application requests the computing device 130 to determine serialization scheme used in generating the serialized object 230.

In some embodiments, the source code of the first application 205 and the second application 210 are written using a high level programming language, such as Java, JavaScript, C++, .Net. The source code is converted, e.g., compiled, to generate either the intermediate code or machine executable code for the application to be executed by a processor (not illustrated) of the system 400. The machine executable code is typically a low-level hardware specific code generated by translating, e.g., compiling, linking, either the source code or the intermediate code. The intermediate code is typically intermediate to the source code and the machine executable code. For example, for Java applications the intermediate code can be a bytecode, which is generated by compiling the source code. The bytecode may often be either directly executed on a virtual machine (e.g., interpreter), or it may be further compiled into the machine code for better performance.

Typically, applications are installed on the computing devices 130-140 by installing machine executable code or intermediate code of the applications. The source code of the applications may not be installed on end user devices such as the computing devices 130-140 for various reasons, including preventing an end user from modifying the application by changing the source code of the application. Accordingly, the computing device 130 may have to determine the serialization scheme used by the first application 205 using the machine executable code or the intermediate code of the first application 205. In some embodiments, the first application 205 and is installed on the computing device 130 as a bytecode 415. The bytecode 415 is intermediate code of the first application 205, which is generated by compiling the corresponding source code of the first application 205.

The system 400 includes a code analyzing module 405 that reads the bytecode 415 of the first application 205 and identifies the portion of the bytecode 415 that contains the code of the serialization method 315 for generating the serialized object 230. In some embodiments, the code analyzing module 405 identifies the serialization code 315 by identifying the portion of the bytecode 415 that contains bytecode operations corresponding to the serialization API of the programming language in which the first application 205 is written.

After the serialization code 315 is identified, a serialization scheme lookup module 410 of the system 400 compares the serialization code 315 with serialization scheme templates 420 having bytecode corresponding to various known serialization schemes to identify a matching serialization scheme template 425. If a match is found, the serialization scheme corresponding to the matching serialization scheme template 425 is identified as the serialization scheme used in generating the serialized object 230 and the computing device notifies the second application 210 regarding the serialization scheme. The second application 210 (or another component in the computing device 130) may deserialize the serialized object and reconstruct the object 220.

In some embodiments, the serialization scheme lookup module 410 is configured to determine if a specific serialization scheme, e.g., a default serialization scheme provided by the programming language of the first application 205, is used in generating the serialized object 230. In such embodiments, the system 400 may include a single serialization scheme template having bytecode corresponding to the specific serialization scheme. The serialization scheme lookup module 410 compares the serialization code 315 with the single serialization scheme template and determines whether the serialization code 315 matches with the single serialization scheme template. If the serialization code 315 matches with the single serialization scheme template, the serialized object 230 is determined to be serialized using the specific serialization scheme.

In some embodiments, the code analyzing module 405 may also convert the bytecode 415 to a pseudo-source code format, a format which is part bytecode format and part source code format. For example, the method names, class names, the input parameters to the methods can be in source code format and the other code, e.g., code within the methods may be in bytecode format. In some embodiments, the pseudo-source code can be generated from the bytecode 415 using a disassembler application provided by a programming language of the source code of the first application 205. For example, a pseudo-source code can be generated from a bytecode of a Java application using the "javap" disassembler provided by Java.

In some embodiments, comparing the pseudo-source code of the serialization code may be faster than comparing the bytecode. If the bytecode 415 is converted to the pseudo-source code, the serialization scheme lookup module 410 may use the serialization scheme templates that contain the code in the pseudo-source code format for the comparison.

Further, in some embodiments, the criteria for comparing the serialization code 315 with the bytecode of the serialization scheme templates 420 can also be customized. For example, the serialization scheme lookup module 410 may be configured to compare the operations of the bytecode 415 and not the operands.

Figure 5:
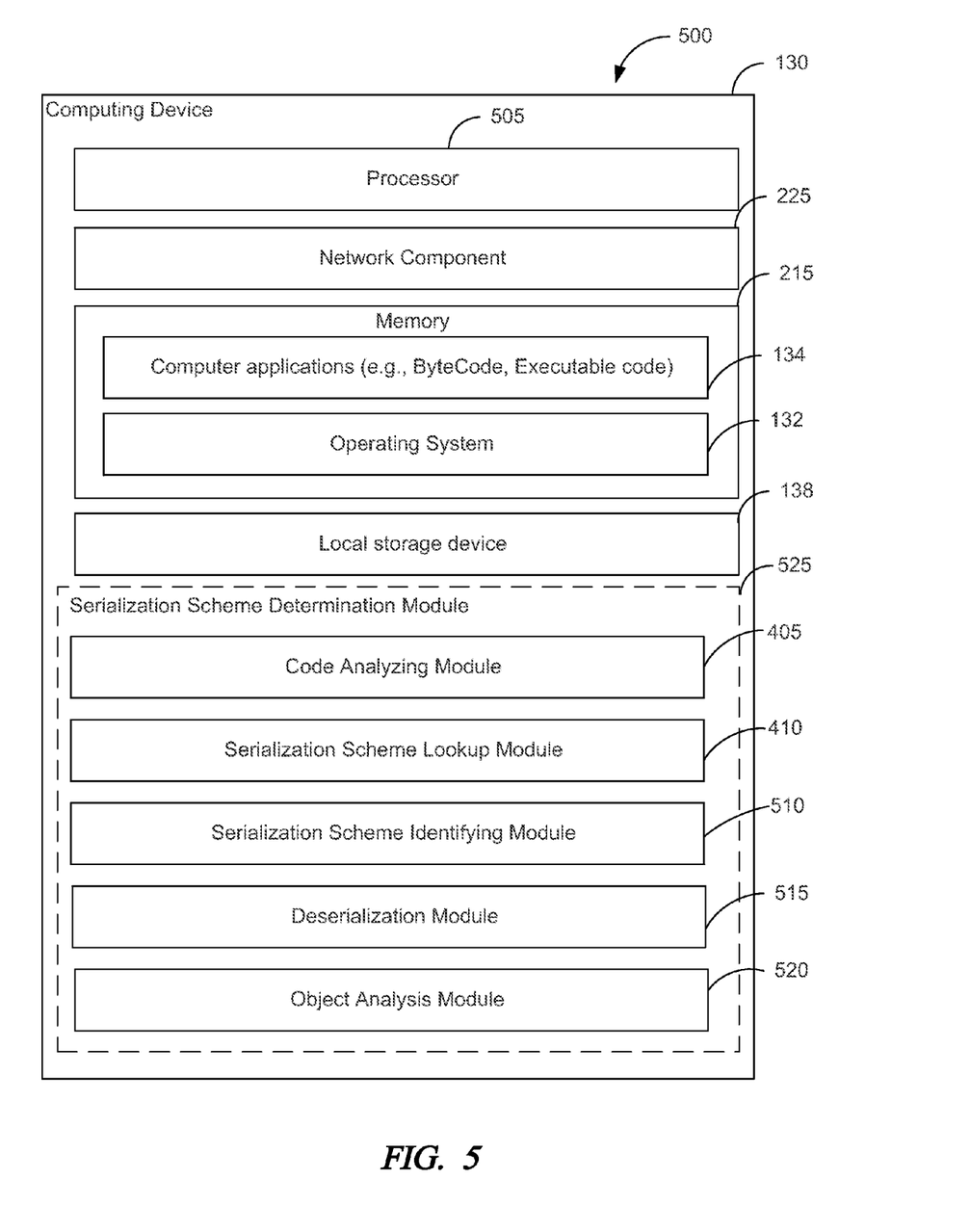
FIG. 5 illustrates a block diagram of a computing device for determining a serialization scheme used in serializing the object, consistent with various embodiments of the disclosed technology.

FIG. 5 illustrates a block diagram 500 of a computing device 130, consistent with various embodiments of the disclosed technology. The computing device 130 can include a processor 505, a network component 225, a memory 215, the local storage device 138, the code analyzing module 405, the serialization scheme lookup module 410, a serialization scheme identifying module 510, a deserialization module 515, and an object analysis module 520. The memory 215 can store instructions of the operating system 132 of the computing device 130. The memory 215 can further store instructions, e.g., bytecode 415, of the computer applications 134 designed to run at the computing device 130.

The network component 225 can be capable of switching between states including a high power consumption state and a low power conservation state. The network component 225 can be, e.g. a Wi-Fi networking adapter, a cellular phone networking adapter, or a combination thereof. The processor 505 is configured to execute the computer applications 134 and the operating system 132 of the computing device 130. The memory 215 stores instructions of the operating system 132 which, when executed by the processor 505, cause the operating system 132 to perform processes for realizing certain functionalities of the computing device 130. For instance, the process of the operating system 132 can facilitate the computer applications 134 to serialize objects, deserialize objects, transmit or receive data related to the computer applications 134 from the cloud proxy service 110 in FIG. 1 and/or other computing devices, e.g., computing device 140.

The local storage device 138, as described above, can store the instructions, e.g., bytecode 415 of the computer application 134, the operating system 132, the serialized objects, e.g., serialized object 230, user data and any other data necessary for the operation of the computing device 130 and execution of the computer applications 134.

The computing device 130 also includes the code analyzing module 405 that identifies a portion of the code of an application that contains the code for serializing an object and the serialization scheme. For example, the code analyzing module 405 identifies the serialization code 315 in the bytecode 415 that generates the serialized object 230. The serialization scheme lookup module 410 compares the serialization code from the intermediate code of the application with one or more serialization scheme templates having code corresponding to various known serialization schemes to identify a matching serialization scheme template. For example, the serialization scheme lookup module 410 compares the serialization code 315 with serialization scheme templates 420 to identify a matching serialization scheme template 425. If a match is found, a serialization scheme identifying module 510 identifies the serialization scheme corresponding to the matching serialization scheme template as the serialization scheme used in generating the serialized object.

A deserialization module 515 deserializes the serialized object based on the identified serialization scheme to reconstruct the object from the serialized object. In some embodiments, reconstructing the object can include creating an instance of the object that is a copy of the object that was serialized. The reconstructed object will have the same state as the object that is serialized.

After the object is reconstructed from the serialized object, the reconstructed object may be used by various applications for various purposes. For instance, a second application 210 of the computer application 134, or an application in another computing device, e.g., computing device 140, may use the reconstructed object in the second application 210 for providing integration or interoperability with other applications. For example, a document created and stored in a serialized format by a first document processing application can be accessed in a second document processing application if the second document processing application is capable of reconstructing the document from the serialized format. The second document processing application provides integration or interoperability with the first document processing application by allowing the document created by the first document processing application to be accessed using the second document processing application.

In some embodiments, the object may be reconstructed to generate various analytical information regarding the object. An object analysis module 520 generates analytical information regarding the object, including serialization scheme used, size of the serialized object, number of attributes in the object, number of classes referenced, relationship between the number of attributes and the size of the serialized object, time taken to deserialize the serialized object, relationship between the number of attributes and the time take to deserialize the serialized object, etc.

In some embodiments, the code analyzing module 405, the serialization scheme lookup module 410, the serialization scheme identifying module 510, the deserialization module 515, and the object analysis module 520 can be part of a serialization scheme detection module 525. The serialization scheme detection module 525 may be provided by an entity such as the provider of the operating system 132, a provider of the cloud proxy service 110, or a provider of the computing device 130 or 140. The serialization scheme detection module 525 may be further customized or configured by a user such as the user of the computing device 130 or a provider of the computer applications 132.

Figure 6:
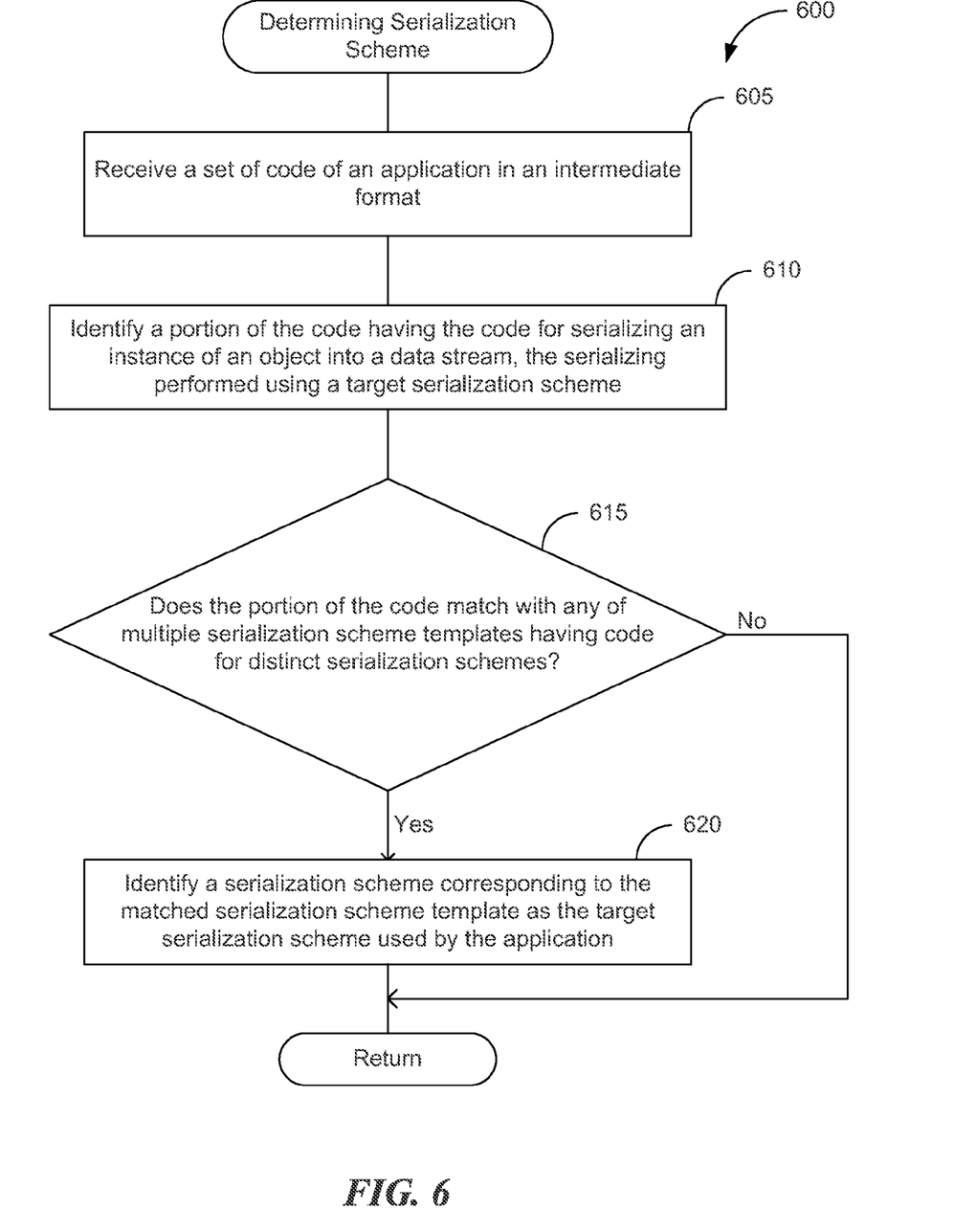
FIG. 6 is a flow diagram of a process of determining a serialization scheme used in serializing the object, consistent with various embodiments of the disclosed technology.

FIG. 6 is a flow diagram of a process 600 of determining a serialization scheme used in serializing an object, consistent with various embodiments of the disclosed technology. In some embodiments, the process 600 may be implemented in the environment 100 of FIG. 1, and using the system 500 of FIG. 5. At block 605, the code analyzing module 405 receives a set of code of an application that serializes an object into a data stream. In some embodiments, the set of code of the application can be in an intermediate format.

An intermediate format code is typically generated by translating, e.g., compiling, a corresponding source code, which is written in a high level programming language. The intermediate code is typically intermediate to the source code and the machine executable code. For example, if the application is a Java application, the intermediate code for the application can be a bytecode, e.g., bytecode 415. The bytecode may often be either directly executed on a virtual machine (e.g., interpreter), or it may be further compiled into the machine code for better performance. Further, in some embodiments, the set of code can also be in a pseudo-source code format, a format which is part bytecode format and part source code format.

At block 610, the code analyzing module 405 identifies a portion of the code having code for (a) serializing an instance of the object into the data stream and (b) the serialization scheme used in serializing the object (collectively referred to as "serialization code"). In some embodiments, the code analyzing module 405 identifies the serialization code by identifying the portion of the code that contains operations corresponding to the serialize API of the programming language in which the application is written.

At decision block 615, the serialization scheme lookup module 410 determines whether the serialization code of the application matches with any of multiple serialization scheme templates. The serialization scheme templates have code corresponding to various known serialization schemes. In some embodiments, the serialization scheme templates can be stored in various formats to support comparison with the serialization code of the application in various formats. For example, the serialization scheme templates can be stored in a bytecode format and/or a pseudo source format to support comparison in either or both formats. The various formats of the serialization scheme templates may be stored at the computing device 130, or at the cloud proxy service 110, contain the code in the same format as that of the portion of the code of the application with which the serialization scheme templates are compared.

In some embodiments, the criteria for comparing the serialization code with the code of the serialization scheme templates can be customized. For example, the serialization scheme lookup module 410 may be configured to compare the operations of the bytecode 415 but not the operands with the operations in the code of the serialization scheme templates.

If no matching serialization scheme template is found, the process 600 returns. However, if the serialization scheme lookup module 410 identifies a matching serialization scheme template, at block 620, the serialization scheme identifying module 510 identifies a serialization scheme corresponding to the matched serialization scheme template as the serialization scheme used by the application, and the process 600 returns.

In some embodiments, the process 600 is configured to determine if a specific serialization scheme, e.g., a default serialization scheme provided by the programming language in which the application is written, is used in generating the serialized object. In such embodiments, the process 600 may involve comparing the serialization with a single serialization scheme template having code corresponding to the specific serialization scheme. If the serialization code matches with the single serialization scheme template, the serialized object is determined to be serialized using the specific serialization scheme.

Figure 7:
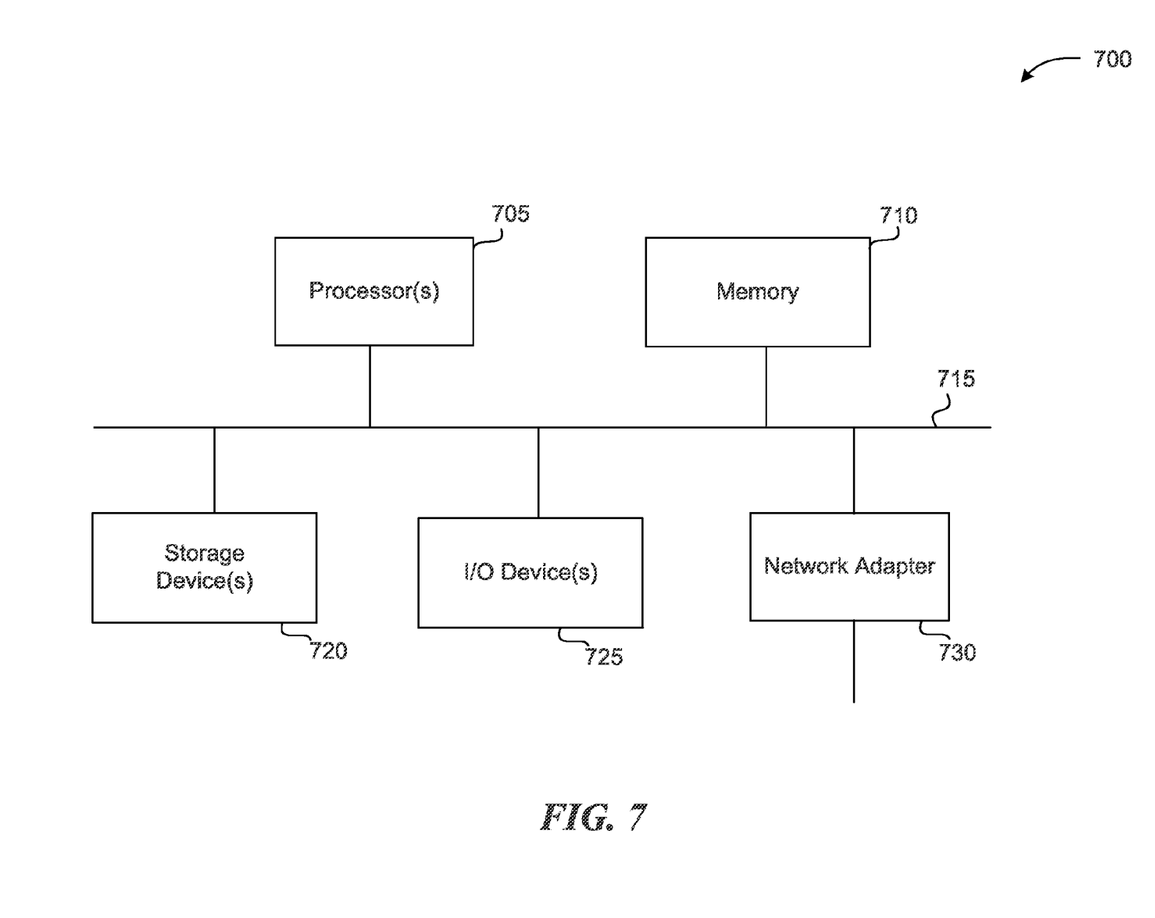
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may be used to implement any of the entities, components or services depicted in the examples of FIGS. 1-6 (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the computing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
    receiving, by a computing system, a code of an application, the code being in an intermediate format, the intermediate format being intermediate to a source format and an executable format of the code;
    translating, by the computer system, the code from the intermediate format to the pseudo-intermediate format;
    comparing, by the computer system, one or more portions of the code in the pseudo-intermediate format with one or more application programming interface (API) associated with serialization of a given object into a corresponding data stream;
    identifying, by the computing system, a particular portion of the code from the one or more portions of the code, the particular portion of the code including a reference to at least one of the one or more API, wherein the particular portion of the code includes the code for serializing an instance of the given object into its corresponding data stream, the serializing performed using a target serialization scheme;
    determining, by the computer system, if the particular portion of the code matches with one of multiple serialization scheme templates, the serialization scheme templates corresponding to distinct serialization schemes; and
    responsive to a determination that the portion of the code matches with a serialization scheme template of the serialization scheme templates, identifying, by the computer system, a serialization scheme corresponding to the serialization scheme template as the target serialization scheme used by the application.

2. The computer-implemented method of claim 1 further comprising:

deserializing the data stream using the target serialization scheme to obtain an instance of the object, the instance of the object having a plurality of attributes and corresponding attribute values.

3. The computer-implemented method of claim 2 further comprising:
generating an analysis of the object, the analysis including information regarding the attributes of the instance; and
using the instance of the object in another application based on the analysis.

4. The computer-implemented method of claim 1, wherein the source format of the code is generated using an object oriented programming language, and wherein the code in the intermediate format is a bytecode of the application.

5. The computer-implemented method of claim 1, wherein the serialization scheme templates include a set of code for the serialization schemes in the intermediate format.

6. The computer-implemented method of claim 5, wherein determining if the portion of the code matches with one of multiple serialization scheme templates includes:
comparing the portion of the code in the intermediate format with the serialization scheme templates in the intermediate format, and
identifying the serialization scheme template whose corresponding set of code for the corresponding serialization scheme matches with the portion of the code.

7. The computer-implemented method of claim 1, wherein the serialization scheme templates include a set of code for the serialization schemes in a pseudo-intermediate format, the pseudo-intermediate format being a combination of the intermediate format and the source format.

8. The computer-implemented method of claim 7, wherein identifying a portion of the code having the code for serializing an instance of an object into a data stream includes:
translating, by the computer system, the code from the intermediate format to the pseudo-intermediate format,
comparing the portion of the code in the pseudo-intermediate format with the serialization scheme templates, and
identifying the serialization scheme template whose corresponding set of code for the corresponding serialization scheme matches with the portion of the code.

9. The computer-implemented method of claim 8, wherein translating the code from the intermediate format to the pseudo-intermediate format includes using a translator application associated with a programming language in which the application is generated to translate the code into the pseudo-intermediate format.

10. The computer-implemented method of claim 1, wherein the object is an user interface element.

11. The computer-implemented method of claim 9, wherein the application includes a plurality of user interface elements, and wherein at least a subset of the user interface elements are serialized based on distinct target serialization schemes.

12. The computer-implemented method of claim 1 further comprising:
storing the data stream as a serialized object at a storage device of the computing system.

13. A computer-implemented method, comprising:
receiving, by a computing system, a bytecode of a graphical user interface (GUI) based application, the application having a plurality of user interface (UI) elements;
translating, by the computing system, the bytecode of the application into a pseudo-bytecode;
comparing, by the computer system, one or more portions of the code in the pseudo-bytecode with serialization of a given instance of a given UI element into a corresponding data stream;
identifying, by the computing system, a particular portion of the bytecode from the one or more portions of the bytecode, that particular portion of the bytecode including a reference to at least one of the one or more API, wherein the particular portion of the bytecode includes the code for serializing an instance of a UI element of the UI elements into its corresponding data stream, the serializing performed using a target serialization scheme;
determining, by the computer system, if the particular portion of the bytecode matches with a serialization scheme corresponding to a serialization scheme template; and
responsive to a determination that the particular portion of the bytecode matches with the serialization scheme template, identifying, by the computer system, the serialization scheme corresponding to the serialization scheme template as the target serialization scheme used by the application.

14. The computer-implemented method of claim 13, wherein the bytecode of the application is an intermediate code, the intermediate code being intermediate to a corresponding source code and corresponding executable code of the application.

15. The computer-implemented method of claim 14, wherein the pseudo-bytecode is a format that includes a first portion of a code of the application in a source code format and a second portion of the code in a bytecode format.

16. The computer-implemented method of claim 13 further comprising:
deserializing the data stream using the target serialization scheme to obtain an instance of the UI element, the instance of the UI element having a plurality of attributes and corresponding attribute values.

17. The computer-implemented method of claim 16 further comprising:
generating an analysis of the instance of the UI element, the analysis including information regarding the attributes of the instance; and
using the instance of the UI element in another application based on the analysis.

18. The computer-implemented method of claim 13, wherein translating the bytecode to the pseudo-bytecode includes using a translator application associated with a programming language in which the application is generated to generate the pseudo-bytecode.

19. An apparatus, comprising:
a processor;
a code analyzing module that works in cooperation with the processor to identify a portion of a code of an application representing the code for serializing an instance of an object into a data stream, the identification of the portion of the code being performed by converting the code into a pseudo-intermediate format and comparing one or more portions of the code in the pseudo-intermediate format and comparing one or more portions of the code in the pseudo-intermediate format with one or more application programming interface (API) associated with serialization of a given object into a corresponding data stream, the serializing performed using a target serialization scheme, wherein the portion of the code being identified includes a reference to at least one of the one or more API;
a serialization scheme lookup module that works in cooperation with the processor to find a serialization scheme template from multiple serialization scheme templates that matches with the portion of the code, the serialization scheme templates including sets of code corresponding to distinct serialization schemes; and a serialization scheme identifying module that works in cooperation with the processor to identifying a serialization scheme corresponding to the serialization scheme template as the target serialization scheme used by the application.

20. The apparatus of claim 19, wherein the code of the application is in an intermediate format, the intermediate format being intermediate to a source format and an executable format of the code.

21. The apparatus of claim 19 further comprising:

a deserialization module to deserialize the data stream using the target serialization scheme to obtain an instance of the object, the object having a plurality of attributes and corresponding attribute values.

22. The apparatus of claim 19 further comprising:

an object analysis module to generating an analysis of the instance of the object, the analysis including information regarding the attributes of the instance.

\* \* \* \* \*